United States Patent [19]

Hoshiba

[11] Patent Number: 5,355,277
[45] Date of Patent: Oct. 11, 1994

[54] THIN FILM CAPACITOR
[75] Inventor: Kazuhiro Hoshiba, Kyoto, Japan
[73] Assignee: Rohm Co. Ltd., Kyoto, Japan
[21] Appl. No.: 992,197
[22] Filed: Dec. 17, 1992
[30] Foreign Application Priority Data
Dec. 27, 1991 [JP] Japan .................................. 3-346683
[51] Int. Cl.⁵ .............................................. H01G 4/10
[52] U.S. Cl. .................. 361/313; 361/321.1; 361/321.2; 361/328
[58] Field of Search ...................... 361/321.1, 322, 313, 361/329, 323, 328, 321.2; 29/25.42

[56] References Cited
U.S. PATENT DOCUMENTS 4,312,027  1/1982  Stockman ........................... 361/329
4,437,139  3/1984  Howard ............................... 361/313

Primary Examiner—Marvin M. Lateef
Attorney, Agent, or Firm—Nikaido, Marmelstein, Murray & Oram

[57] ABSTRACT

A thin film capacitor includes a first capacitor composed of a ferroelectric film and a supplementary second capacitor composed of the ferroelectric film surrounding the first capacitor. In a capacitor of the present invention, the second capacitor is formed around a capacitor and the polarized condition thereof is possible to be controlled. Due to this original switching time of the first capacitor can be flexibly adjusted, and there is a significant advantage that switching characteristic of a capacitor can be greatly improved with minimum cost.

5 Claims, 5 Drawing Sheets

THIN FILM CAPACITOR

FIELD OF THE INVENTION

The present invention relates to a thin film capacitor, which is used for a storage cell or the like, employing a ferroelectric film, and more particularly to a thin film capacitor of which switching time for reversing polarized direction is variable under application of voltage from outside.

BACKGROUND OF THE INVENTION

A thin film capacitor employing a ferroelectric film has been conventionally utilized as a storage cell taking advantage of its reinanent polarization. One example of the storage cell is shown in FIG. 9 with its equivalent circuit and in FIG. 10 with its cross section.

In FIG. 10, numerals 12 to 15 respectively represent a ferroelectric film, a lower electrode, a diffusion layer and a gate electrode. Numerals 16 to 18 respectively represent a first insulating film, a second insulating film and a film wiring made of aluminum. Numerals 19 and 20 respectively represent a field oxide film and an upper electrode. In a storage cell of this constitution, one transistor 22 and one capacitor 21 comprising the ferroelectric film 12, the lower electrode 13 and the upper electrode 20 are connected with each other. When a sufficient positive or negative voltage higher than coercive voltage is applied to the capacitor 21, the positive or the negative reinanent polarization is realized due to hysterisis of the ferroelectrics. By applying a pulse voltage of constant polarity to the polarized capacitor 21, information which has caused the reinanent polarization can be read out.

The switching time for reversing polarized direction of the ferroelectric film capacitor is generally given by the following formula.

$$t_s = t_o \exp\left(\frac{\alpha}{E}\right) \text{ or } t_s = kE^{-n}$$

where, $\alpha$ is an activation electrical field $t_o$, k and n are respectively a certain constant, and E is an electrical field. As is obvious from the formula, in order to vary the switching time the applied electrical field must be varied. Thus, there is a problem that with respect to one sample the switching time can not be varied unless the electrical field is varied.

On the other hand, for realizing rapid operation of a storage cell there is some requirements for more rapid switching time of a ferroelectrics capacitor.

SUMMARY OF THE INVENTION

In view of the above-mentioned problem, an object of the present invention is to provide a thin film capacitor employing a ferroelectric film of which switching time is variable without varying the voltage applied between both electrodes of the capacitor.

According to the present invention, there is provided a thin film capacitor comprising: a first capacitor composed of a ferroelectric film, and an upper electrode arranged at one surface of the ferroelectric film and a lower electrode arranged at the other surface of the ferroelectric film, and a supplementary second surrounding the first capacitor.

In a thin film capacitor of the present invention, a supplementary second capacitor is formed so as to surround a first capacitor composed of electrodes arranged at both surfaces of a ferroelectric film. Electrical field, which is independent from that applied to the first capacitor to be originally used as a capacitor can be applied to the second capacitor. Due to this, the switching time of the first capacitor to be originally used as a capacitor can be adjusted by adjusting the electrical field applied to the second capacitor and the polarity of the second capacitor.

That is, when the polarized direction of the first capacitor is reversed from "downward" to "upward" with the polarized direction of the supplementary second capacitor being kept in "upward", this "upwar" polarized direction of the second capacitor influences on the first capacitor to assist the reverse of its polarized direction to "upward". Thus the switching time can be shortened than that in the case of no second capacitor.

When the polarized direction of the first capacitor is reversed from "upward" to "downward" with the polarized direction of the supplementary second capacitor being kept in "upward", this "upward" polarized direction of the second capacitor influences on the first capacitor to prevent the reverse of its polarized direction to "downward". Thus the switching time is lengthened than that in the case of no second capacitor.

The adjustment of the switching time of the first capacitor can be carried out depending on the applied voltage to the second capacitor. Though polarization level of a ferroelectric film is not further increased under voltage higher than a certain value, as far as the applied voltage is low the polarization level varies proportionally to the applied voltage and the polarized level of the second capacitor influences on the switching time of the first capacitor for reversing its polarized direction.

Thus, the switching time of the original first capacitor can be flexibly adjusted depending on the applied voltage to the supplementary second capacitor and on a polarity of the second capacitor.

DETAILED DESCRIPTION

Figure 1:
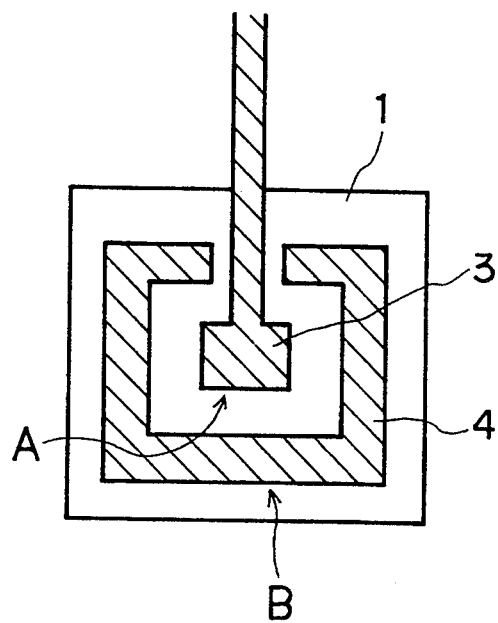
FIG. 1 is an explanatory plan view of an embodiment of a thin film capacitor of the present invention.
Figure 2:
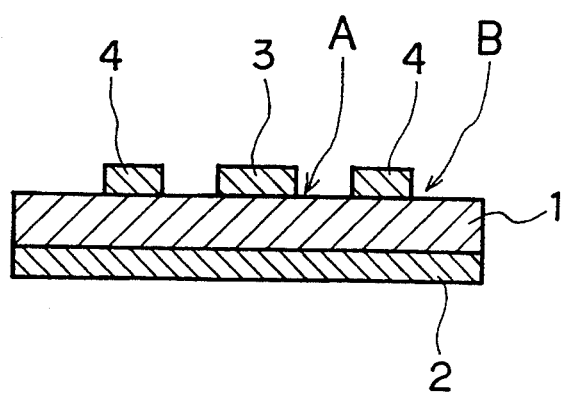
FIG. 2 is cross section of the thin film capacitor of FIG. 1.

The present invention is explained below with reference to the drawings. FIG. 1 is an explanatory plan view of an embodiment of a thin film capacitor of the present invention, and FIG. 2 is a cross section thereof. In these FIGURES, numeral 1 represents a ferroelectric film of for example PZT (PbZr$_{1-x}$ Ti$_x$ O$_3$) and numeral 2 represents a lower electrode, one of electrodes arranged at both surfaces of the ferroelectric film 1. Numeral 3 represents a first upper electrode, the other of the electrodes and numeral 4 represents a second upper electrode formed so as to surround the first upper electrode 3. The electrode 4, the electrode 2 and the ferroelectric film 1 therebetween constitute a second capacitor B.

In this embodiment, the lower electrode 2 which constitutes the second capacitor B is formed continuously with the lower electrode 2 of a first capacitor A, that is, the lower electrode 2 is shared by the capacitors A and B.

The upper and lower electrodes of the capacitors A and B can be both formed separately, otherwise as in the above embodiment one of the electrodes might be shared. However, at least one electrode of the second capacitor B must be separated from that of the first capacitor A in order to realize the second capacitor B.

The ferroelectric film 1 is polarized only at a part where electrical field is applied by the electrodes arranged at both surfaces thereof. The film 1 is not polarized at a part where the electrodes are not arranged because an electrical field is not applied thereto. Even if the film 1 is formed widely, the part where the electrodes are not arranged is not influenced at all by the electrical field. An electrical field is applied to the film 1 only when both upper and lower electrodes are arranged at both surfaces of the film 1 and voltage is applied to the electrodes. That is, one electrode alone can not apply an electrical field to the film 1. For that reason, in the above embodiment, the film 1 serves as a capacitor only at a part where the upper electrodes 3 and 4 are arranged. A part where one of the electrodes is not arranged does not serve as a capacitor.

Since the first and the second capacitors A and B are much closely formed, reserving the polarized direction of the first capacitor A is influenced by a polarized condition of the surroundings. For that reason, in a case where the polarized direction of the second capacitor B is "upward", when reversing the polarized direction of the first capacitor A from "downward" to "upward" the switching time t is shortened under influence of the "upward" polarized direction of the second capacitor B than switching time $t_{so}$. The $t_{so}$ is a switching time in a case where the second capacitor does not exist.

Conversely, in a case where the polarized direction of the second capacitor B is "upward", when reversing the polarized direction of the first capacitor A from "upward" to "downward", the switching time t is lengthened under influence of the "upward" polarized direction of the second capacitor B than switching time $t_{so}$. The above relationships are summarized into Table 1, including cases where the polarized direction of the capacitor B is "downward".

TABLE 1

| polarized direction of the second capacitor B | reversing of polarized direction of the first capacitor A | switching time |
|---|---|---|
| "upward" | "downward" → "upward" | $t < t_{so}$ |
| "upward" | "upward" → "downward" | $t > t_{so}$ |
| "downward" | "downward" → "upward" | $t > t_{so}$ |
| "downward" | "upward" → "downward" | $t < t_{so}$ |

Figure 3:
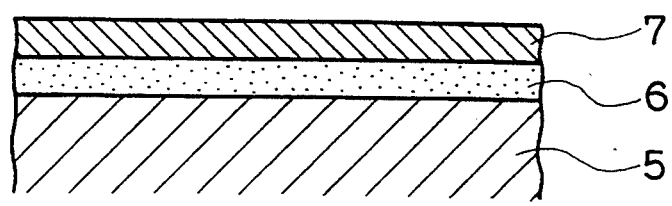
FIGS. 3 to 5 are respectively an explanatory view showing each step of producing the thin film capacitor of FIG. 1.
Figure 4:
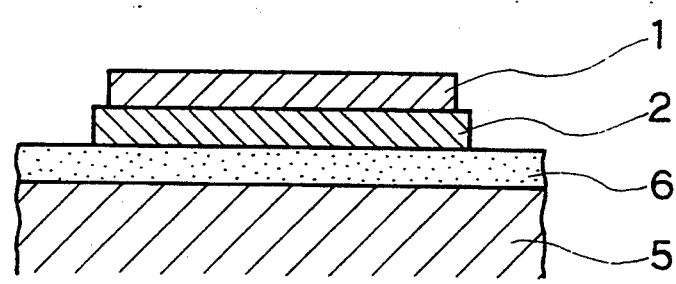
Figure 5:
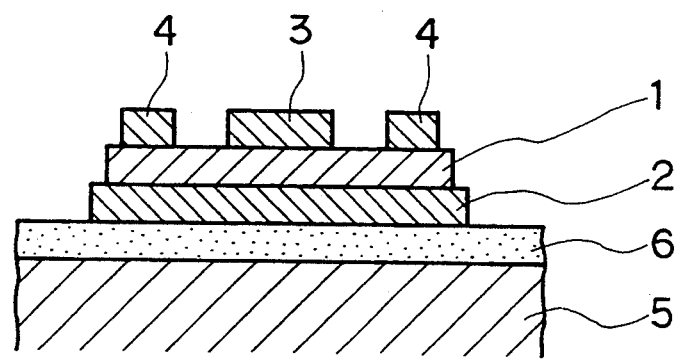

One embodiment of a method for producing the thin film capacitor is explained below. FIGS. 3 to 5 are explanatory views respectively showing each step of a method of an embodiment of the present invention for producing a thin film capacitor.

As shown in FIG. 3, a silicon dioxide film 6 of about 3000Å thickness is formed on a silicon semiconductor substrate 5 by thermal oxidation at about 900° C. for about 90 minutes. Thereafter, a platinum film 7 intended for a lower electrode 2 is deposited in about 3000Å thickness by sputtering. The film 6 is not limited to silicon dioxide and the substrate 5 is not limited to silicon, that is, other semiconductor substrates of silicon carbide, gallium arsenide or the like and other insulating film can be employed. Further the metal film 7 intended for the lower electrode 2 might be directly formed on an insulating substrate of ceramics or the like.

As shown in FIG. 4, the metal film 7 of platinum is patterned to form the lower electrode 2. This patterning is performed in a manner that undesired part of the film 7 is removed by ion milling or the like with a photoresist being used as a mask. Then PZT, a ferroelectric substance, is deposited in about 5000Å thickness by for example sputtering. The deposition of PZT can also be performed by MOCVD method or by sol-gel method other than the sputtering. Thereafter the PZT is patterned and an undesired part thereof is removed to form a ferroelectric film 1. As the ferroelectric substance, $PbTiO_3$, PLZT ($(Pb_{1-x}La_x)(Zr_{1-y}Ti_y)_{1-x/4}O_3$) or the like can be employed because of their high spontaneous polarization, however, other ferroelectrics can also be employed.

As shown in FIG. 5, a metal film of platinum intended for upper electrodes is deposited in about 3000Å thickness on the ferroelectric film 1 by for the example sputtering. This metal film is patterned by for example ion milling to form the first upper electrode 3 of the first capacitor A and to form the second upper electrode 4 of the second capacitor B. These upper electrodes 3 and 4 are so formed that, as shown in FIG. 1, the electrode 4 surrounds the electrode 3 and is cut only at a region where a wiring to the electrode 3 passes.

The upper electrodes can be formed of other materials similar to the case of lower electrode. The upper and lower electrodes can be easily formed even in a case where the lower electrode is separated to be intended for that of the first and the second capacitors A and B, and the upper electrode is formed continuously without separation like in the above embodiment, and even in a case where both upper and lower electrodes are formed separately.

Figure 6:
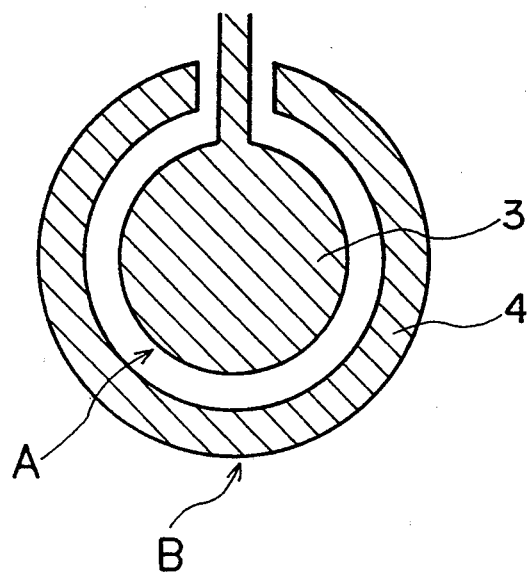
FIG. 6 is an explanatory plan view of another embodiment of a thin film capacitor of the present invention.
Figure 7:
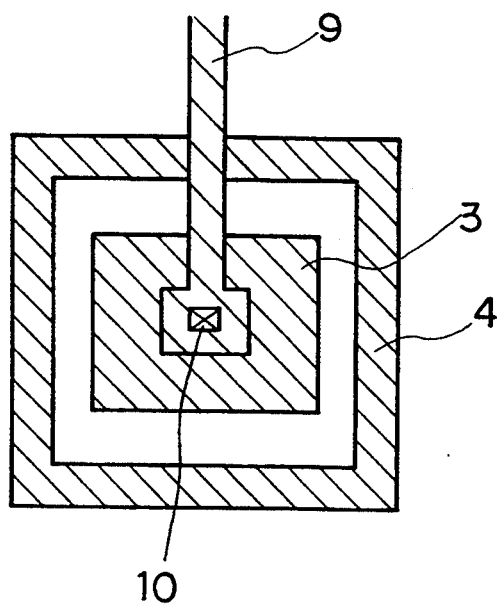
FIG. 7 is an explanatory plan view of still another embodiment of a ,thin film capacitor of the present invention.

In FIGS. 6 and 7, other examples of a thin film capacitor of the present invention are shown. FIG. 6 is a plan view where the first capacitor A is circular with circular upper electrode. In this case, the second upper electrode 4 is formed in a ring-shape so as to surround the circular upper electrode 3. This makes it possible to control the switching time with applied voltage to the second capacitor.

Figure 8:
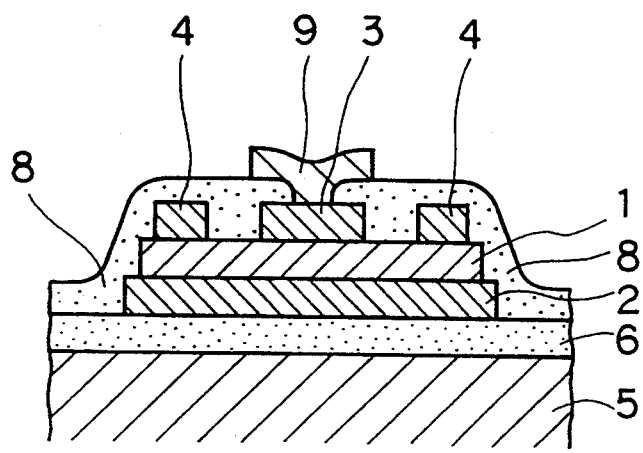
FIG. 8 fan explanatory cross section of the thin film capacitor FIG. 7.
Figure 9:
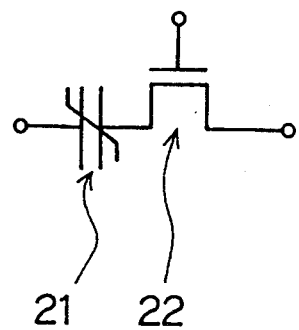
FIG. 9 is .an equivalent circuit of a storage cell employing a ferroelectric film capacitor.
Figure 10:
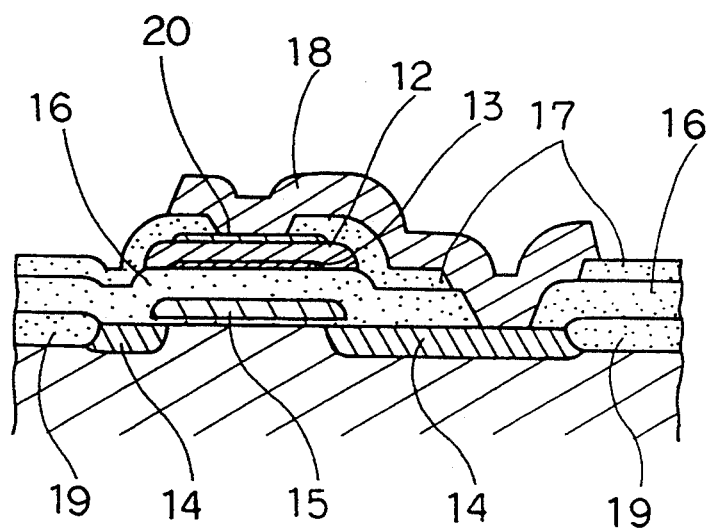
FIG. 10 is an explanatory cross section of a semiconductor wherein a storage cell is constructed with a ferroelectric film capacitor.

In a constitution shown in FIG. 7, the upper electrode 4 of the second capacitor completely surrounds the upper electrode 3. This is more preferable from a viewpoint of characteristic. In this case, a film wiring 9 to the upper electrode 3 must be separately formed of for example aluminum. A contact 10 is arranged to the electrode 3 and an insulating film 8 is arranged on the electrode 4 under the film wiring 9 so that both electrodes can be formed electrically separated from each other. FIG. 7 shows only the upper electrodes and the cross section thereof is shown in FIG. 8. The film wiring 9 is positioned on the insulating film 8 and is insulated from the electrode 4. In FIG. 8, other numerals represent the same elements as in FIG. 5.

As explained above, according to the present invention, a second capacitor is formed around a conventional capacitor and the polarized condition thereof is possible to be controlled. Due to this, the switching time of an original first capacitor can be flexibly adjusted to give significant effect to a rapid operation of a storage cell or the like.

A second capacitor in the present invention can be realized only by arranging a patterning of a mask for forming electrodes. This does not bring additional steps, but only require a slight increase of area. Thus there is a significant advantage that switching characteristic of a capacitor can be greatly improved with minimum increase of cost.

Though several embodiments of the invention are described above, it is to be understood that the present invention is not limited to the above-mentioned embodiments, and various changes and modifications may be made in the invention without departing from the spirit and scope thereof.

What is claimed is:

1. A thin film capacitor comprising:
   a first capacitor including a ferroelectric film, and a first electrode arranged at one surface of said ferroelectric film and said first electrode arranged at the other surface of said ferroelectric film; and
   A supplementary second capacitor including said ferroelectric film, and a second electrode arranged at said one surface of said ferroelectric film and said second electrode arranged at said other surface of said ferroelectric film, said supplementary second capacitor surrounding said first capacitor.

2. The thin film capacitor of claim 1 wherein one of the seemed electrodes of the supplement second capacitor is formed continuously with a corresponding first electrode of the first capacitor.

3. The thin film capacitor of claim 1 wherein both second electrodes of the supplementary second capacitor are formed separately from corresponding first electrodes of the first capacitor.

4. The thin film capacitor of claim 1 wherein the second electrode arranged at said one surface of said ferroelectric film of the supplementary second capacitor is partially interrupted and a film wiring to the first capacitor passes through an interrupted region on said ferroelectric film, wherein both first and second electrodes arranged at said one surface of said ferroelectric film of the first and the second capacitors are electrically separated.

5. The thin film capacitor of claim 1 wherein the second electrode arranged at said one surface of said ferroelectric film of the supplementary second capacitor is endlessly formed and the film wiring to the first electrode arranged at said one surface of said ferroelectric film passes on the second electrode of the supplementary second capacitor arranged at said one surface of said ferroelectric film with an insulating film existing therebetween.

* * * * *